(12) United States Patent
March

(10) Patent No.: US 10,384,302 B2
(45) Date of Patent: Aug. 20, 2019

(54) WELD STUB ARRANGEMENT AND A METHOD OF USING THE ARRANGEMENT TO MAKE AN ARTICLE

(71) Applicant: ROLLS-ROYCE plc, London (GB)

(72) Inventor: Richard N. March, Derby (GB)

(73) Assignee: ROLLS-ROYCE plc, London (GB)

(*) Notice: Subject to any disclaimer, the term of this patent is extended or adjusted under 35 U.S.C. 154(b) by 49 days.

(21) Appl. No.: 15/903,087

(22) Filed: Feb. 23, 2018

(65) Prior Publication Data

US 2018/0243857 A1 Aug. 30, 2018

(30) Foreign Application Priority Data

Feb. 24, 2017 (GB) .................................. 1702998.4

(51) Int. Cl.
 B23K 20/12 (2006.01)
 B23K 20/02 (2006.01)
 (Continued)

(52) U.S. Cl.
 CPC ............ B23K 20/125 (2013.01); B23K 20/02 (2013.01); B23K 20/1205 (2013.01);
 (Continued)

(58) Field of Classification Search
 CPC .... B23K 2101/001; B23K 20/12–1295; B23K 20/10–106; B23K 20/00; B23K 20/002; B23K 20/02–08; F01D 5/02; F01D 5/34; F01D 5/005; F01D 5/3061; F01D 2240/30; F01D 2220/323; F01D 2230/239

USPC ............ 228/112.1–114.5, 2.1–2.3, 110.1, 1.1, 228/115, 233.1, 234.2, 235.1, 3.1, 107, 228/2.5; 29/889–889.722; 156/73.1, 73.5
See application file for complete search history.

(56) References Cited

U.S. PATENT DOCUMENTS 4,864,706 A * 9/1989 Jenkel .................. B23K 11/002
 29/889.21
5,492,581 A * 2/1996 Searle ................ B23K 20/1205
 156/73.5
(Continued)

FOREIGN PATENT DOCUMENTS

EP 0624420 A2 * 11/1994 ........... B23K 20/129
EP 2281653 2/2011
(Continued)

OTHER PUBLICATIONS

Great Britain Search Report dated Aug. 4, 2017 issued in GB Patent Application No. 1702998.4.

*Primary Examiner* — Kiley S Stoner
(74) *Attorney, Agent, or Firm* — Oliff PLC

(57) ABSTRACT

A workpiece for use with a flash producing welding process comprises a revolute body, a plurality of first attachment portions, a plurality of second attachment portions. The revolute body has an axis of rotation.
Each of the first attachment portions has a first radially outer weld joint surface, and each of the second attachment portions has a second radially outer weld joint surface. The revolute body comprises a plurality of first and second stub portions, with each of the first stub portions having a first radially inner weld joint surface, and each of the second stub portions having a second radially inner weld joint surface.

11 Claims, 4 Drawing Sheets

(51) Int. Cl.
  *F01D 5/30* (2006.01)
  *F01D 5/00* (2006.01)
  *F01D 5/02* (2006.01)
  *F01D 5/34* (2006.01)
  *B23K 101/00* (2006.01)

(52) U.S. Cl.
  CPC ............... *F01D 5/005* (2013.01); *F01D 5/02* (2013.01); *F01D 5/3061* (2013.01); *F01D 5/34* (2013.01); *B23K 2101/001* (2018.08); *F05D 2220/323* (2013.01); *F05D 2230/239* (2013.01); *F05D 2240/30* (2013.01)

(56) References Cited

U.S. PATENT DOCUMENTS

| | | | |
|---|---|---|---|
| 6,542,843 B1* | 4/2003 | Metzinger | B23P 6/002 702/113 |
| 2002/0127108 A1* | 9/2002 | Crall | B23K 20/129 416/213 R |
| 2003/0223873 A1* | 12/2003 | Carrier | F01D 5/3061 416/213 R |
| 2005/0084381 A1* | 4/2005 | Groh | B23K 20/129 416/244 A |
| 2005/0274010 A1* | 12/2005 | Rawson | B23K 20/1205 29/889.1 |
| 2006/0034695 A1* | 2/2006 | Hall | B23K 20/12 416/213 R |
| 2008/0219853 A1* | 9/2008 | Baker | F01D 5/02 416/241 R |
| 2008/0244905 A1* | 10/2008 | Meier | B23K 26/24 29/889.1 |
| 2009/0314823 A1* | 12/2009 | Bray | B23K 20/1205 228/112.1 |
| 2010/0284817 A1* | 11/2010 | Bamberg | B23K 15/0046 416/241 R |
| 2011/0194940 A1* | 8/2011 | Tolbert | B21J 5/00 416/223 R |
| 2012/0148413 A1* | 6/2012 | Richter | B23P 6/005 416/223 R |
| 2014/0140859 A1* | 5/2014 | Bales | F01D 5/28 416/96 R |
| 2014/0325842 A1* | 11/2014 | Johnson | B23K 20/1205 29/889.21 |
| 2016/0045988 A1 | 2/2016 | Sweeting | |
| 2017/0022827 A1 | 1/2017 | Waldman et al. | |
| 2017/0328225 A1* | 11/2017 | Mottin | B23K 20/1205 |
| 2018/0029157 A1* | 2/2018 | Bray | F01D 5/063 |
| 2018/0056437 A1* | 3/2018 | Bray | B23K 33/00 |
| 2018/0128109 A1* | 5/2018 | Humes | F01D 5/048 |
| 2018/0209280 A1* | 7/2018 | Forsdike | B23K 15/0086 |
| 2018/0209281 A1* | 7/2018 | Boswell | B23K 20/02 |
| 2019/0022789 A1* | 1/2019 | Mast | B23K 20/1205 |

FOREIGN PATENT DOCUMENTS

| | | | | |
|---|---|---|---|---|
| EP | 2444192 A2 * | 4/2012 | ......... | B23K 20/1205 |
| EP | 3056664 | 8/2016 | | |
| FR | 2998499 A1 * | 5/2014 | ............. | B23P 6/005 |
| GB | 2440345 A * | 1/2008 | ............. | F01D 5/147 |
| JP | 07284994 A * | 10/1995 | ......... | B23K 20/1205 |

* cited by examiner

WELD STUB ARRANGEMENT AND A METHOD OF USING THE ARRANGEMENT TO MAKE AN ARTICLE

CROSS-REFERENCE TO RELATED APPLICATION

This disclosure claims the benefit of UK Patent Application No. GB 1702998.4, filed on 24 Feb. 2017, which is hereby incorporated herein in its entirety.

FIELD OF THE DISCLOSURE

The present disclosure relates to a weld stub arrangement for use with a linear friction welding process and particularly, but not exclusively, to a weld stub arrangement for use with a linear friction welding process to make a bladed disc.

BACKGROUND TO THE DISCLOSURE

Bladed discs, or blisks, are conventionally manufactured by machining the aerofoil and disc elements from a single forging. This is often the most appropriate manufacturing technique where the aerofoils are relatively small but for discs having larger aerofoils, this machining technique wastes a lot of material.

Flash producing welding processes are processes in which material that is softened by heat generated by friction, pressure or an external heat source, is expelled from the weld joint zone.

The use of linear friction welding (LFW) to manufacture bladed discs for use in gas turbine engines offers much better material utilisation, with post-weld machining being required only in regions adjacent to the weld and below the disc rim.

One problem with flash producing welding processes in general, and with LFW manufacturing techniques in particular, is that flash is expelled sideways from the weld joint. In the case of bladed discs, this flash is problematic because the flash generated by one joint between aerofoil and rotor can be expelled sufficiently far from the joint as to interfere with the adjacent joint. This means that either de-flashing is required after each weld, or only alternate aerofoil to rotor friction welds may be completed before the flash is removed. The part-finished blisk must then be refitted to the LFW apparatus to have the intervening aerofoil to rotor friction welds completed.

De-flashing after each weld increases the cost and time required to finish the component. replacing the part-finished blisk in the linear friction welding apparatus in order to have the remaining linear friction welds completed requires careful and precise repositioning the part-finished component, which further increases the cost and time required to finish the component.

SUMMARY OF DISCLOSURE

According to a first aspect of the present disclosure there is provided a workpiece for use with a flash producing welding process, the workpiece comprising:
a revolute body comprising an axis of rotation;
a plurality of first attachment portions, each of the first attachment portions comprising a first radially outer weld joint surface; and
a plurality of second attachment portions, each of the second attachment portions comprising a second radially outer weld joint surface;
wherein the revolute body comprises a plurality of first and second stub portions, each of the first stub portions having a first radially inner weld joint surface, each of the second stub portions having a second radially inner weld joint surface, and respective ones of the first stub portions and second stub portions are arranged in an alternating sequence circumferentially around the axis of rotation,
each of the first radially outer weld joint surfaces is joined to a corresponding one of the first radially inner weld joint surfaces by a flash producing welding process at a first weld joint plane, each of the second radially outer weld joint surfaces is joined to a corresponding one of the second radially inner weld joint surfaces by a flash producing welding process at a second weld joint plane, and
each first weld joint plane is offset from the neighbouring second weld joint plane.

By offsetting the first weld joint plane from the neighbouring second weld joint plane, the flash generated by each linear friction weld between corresponding ones of the first and second stub portions and the first and second attachment portions does not conflict, or clash, with the flash generated by neighbouring joints.

This enables each one of the linear friction welds between corresponding ones of the first and second stub portions and the first and second attachment portions can be completed in a single pass. In other words, it is not necessary to complete the linear friction welds at each alternate stub portion and attachment portion joint before removing the flash generated at each of these joints.

This makes the fabrication of the workpiece quicker and more cost effective than the prior art equivalent, which in turn makes it more convenient for a user.

Optionally, the offset is a radial offset, each first weld joint plane is positioned at a first radius from the axis of rotation, each second weld joint plane is positioned at a second radius from the axis of rotation, the first radius is different to the second radius, and the difference between the first radius and the second radius is the radial offset.

In one embodiment, the first weld joint plane is offset from the second weld joint plane in a radial direction relative to the axis of rotation. During the linear friction welding process the flash is expelled from the weld zone in the plane of the weld joint plane.

Consequently, by offsetting adjacent weld joint planes from one another in the radial direction, the flash produced by each respective linear friction weld joint will either pass above (radially outwardly of) or below (radially inwardly of) the flash produced by the neighbouring linear friction weld joint.

This enables each successive linear friction weld to be completed in a single unbroken sequence with the flash being removed from all of the weld joints once all the weld joints have been completed. This makes the workpiece of the present disclosure more convenient and cost effective for a user.

A consequence of the radial offset between the first weld joint plane and the second weld joint plane is that the first attachment portion and the second attachment portion must necessarily be of different radial length to one another.

The workpiece of the present disclosure has a circumferential array of alternating first weld joints and second weld joints in which the plane of each first weld joint is positioned at a different radius to that of the plane of each adjoining second weld joint.

Optionally, the radial offset is between 5 and 20 mm.

The radial offset distance between adjacent first and second weld joint planes must be sufficient to enable the flash displaced from each weld joint to pass either over (radially outwardly of) or under (radially inwardly of) the flash displaced from the adjacent weld joint.

Optionally, the offset is an angular offset, and each first weld joint plane and each second weld joint plane is angled relative to a tangent to a circumference of the revolute body, by the angular offset.

In this embodiment, the first weld joint plane is angled relative to the second weld joint plane. During the linear friction welding process the flash is expelled from the weld zone in the plane of the weld joint plane.

Consequently, by providing an angular offset between adjacent weld joint planes, the flash produced by each respective linear friction weld joint will either pass above (radially outwardly of) or below (radially inwardly of) the flash produced by the neighbouring linear friction weld joint.

The use of an angular offset between the first weld joint planes and the second weld joint planes enables each of the first attachment portions and the second attachment portions to be identical to one another, where the angular offset of each first weld joint plane and second weld joint plane is the same. This makes the manufacture of the workpiece simpler and more cost effective for a user.

The plane of each of the first weld joint and the second weld joint is inclined relative to a tangent to a circumference of the revolute body. In other words, in the circumferential direction, a radius of one edge of the weld joint plane is different to a radius of a circumferentially opposing edge.

Each of the inclined first weld joint planes and second weld joint planes are inclined in the same sense in a circumferential direction.

Optionally, the angular offset is between 10° and 35°.

The angular offset distance between adjacent first and second weld joint planes must be sufficient to enable the flash displaced from each weld joint to pass either over (radially outwardly of) or under (radially inwardly of) the flash displaced from the adjacent weld joint.

Optionally, the direction of oscillation is parallel to the axis of rotation.

Making the direction of oscillation parallel with the axis of rotation ensures that there remains clearance for the relative movement between the corresponding attachment and stub portions.

Optionally, each of the first attachment portions has a first attachment tip, each of the second attachment portions has second attachment tip, and the plurality of first attachment tips and second attachment tips together define a tip circumference.

Each of the first attachment tips and the second attachment tips has the same radius from the axis of rotation. This ensures that the finished workpiece can be rotationally accommodated within a corresponding housing.

For example, in one arrangement, the revolute body is a rotor and the first and second attachment portions are aerofoils. The requirement for the first and second attachment tips to define a tip circumference ensures that the finished blisk can be rotationally accommodated within a housing.

Optionally, the revolute body is a rotor, and the first and second attachment portions are aerofoils.

The finished workpiece may be a bladed compressor disc ('blisk') for a gas turbine engine. In another arrangement, the finished workpiece may be a bladed turbine disc for a gas turbine engine.

Optionally, the flash producing welding process is selected from the group consisting of linear friction welding, orbital welding, and forge welding.

There are a variety of welding processes that result in the extrusion of flash from a weld joint plane. Any such flash producing methods can be used with the workpiece arrangement of the present disclosure to benefit from the offset of the adjacent weld joint planes.

Of these processes, linear friction welding is likely to produce the greatest quantity of flash from the weld joint plane and as such is most likely to benefit from the feature of the offset of the adjacent weld joint planes.

However, in arrangements where adjacent ones of the attachment portion/stub portion joints are closely spaced together, the use of an alternative flash producing welding process such as forge welding would also derive benefit from the arrangement of the disclosure.

According to a second aspect of the present disclosure there is provided a method for forming a workpiece, the method comprising the steps of:
 providing a revolute body having an axis of rotation, and a plurality of first and second stub portions arranged in an alternating circumferential array around the axis of rotation, each first stub portion having a first radially inner weld joint surface, and each second stub portion having a second radially inner weld joint surface;
 providing a first attachment portion corresponding to each first stub portion, and a second attachment portion corresponding to each second stub portion, each first attachment portion comprising a first radially outer weld joint surface, and each second attachment portion comprising a second radially outer weld joint surface; and
 using a flash producing welding process to weld each first radially outer weld joint surface to a corresponding first radially inner weld joint surface at a first weld joint plane, and each second radially outer weld joint surface to a corresponding second radially inner weld joint surface at a second weld joint plane to form the workpiece, with each first weld joint plane being offset from the neighbouring second weld joint plane.

By offsetting the first weld joint plane from the neighbouring second weld joint plane, the flash generated by each linear friction weld between corresponding ones of the first and second stub portions and the first and second attachment portions does not conflict, or clash, with the flash generated by neighbouring joints.

This enables each one of the linear friction welds between corresponding ones of the first and second stub portions and the first and second attachment portions can be completed in a single pass. In other words, it is not necessary to complete the linear friction welds at each alternate stub portion and attachment portion joint before removing the flash generated at each of these joints.

This makes the method of the disclosure quicker and more cost effective than the prior art equivalent, which in turn makes it more convenient for a user.

Optionally, the offset is a radial offset.

In one embodiment, the first weld joint plane is offset from the second weld joint plane in a radial direction relative to the axis of rotation. During the linear friction welding process the flash is expelled from the weld zone in the plane of the weld joint plane.

Consequently, by offsetting adjacent weld joint planes from one another in the radial direction, the flash produced by each respective linear friction weld joint will either pass above (radially outwardly of) or below (radially inwardly of) the flash produced by the neighbouring linear friction weld joint.

This enables each successive linear friction weld to be completed in a single unbroken sequence with the flash being removed from all of the weld joints once all the weld joints have been completed. This makes the workpiece of the present disclosure more convenient and cost effective for a user.

A consequence of the radial offset between the first weld joint plane and the second weld joint plane is that the first attachment portion and the second attachment portion must necessarily be of different radial length to one another.

Optionally, the radial offset is between 5 and 20 mm.

The radial offset distance between adjacent first and second weld joint planes must be sufficient to enable the flash displaced from each weld joint to pass either over (radially outwardly of) or under (radially inwardly of) the flash displaced from the adjacent weld joint.

Optionally, the offset is an angular offset.

In this embodiment, the first weld joint plane is angled relative to the second weld joint plane. During the linear friction welding process the flash is expelled from the weld zone in the plane of the weld joint plane.

Consequently, by providing an angular offset between adjacent weld joint planes, the flash produced by each respective linear friction weld joint will either pass above (radially outwardly of) or below (radially inwardly of) the flash produced by the neighbouring linear friction weld joint.

The use of an angular offset between the first weld joint planes and the second weld joint planes enables each of the first attachment portions and the second attachment portions to be identical to one another, where the angular offset of each first weld joint plane and second wed joint plane is the same. This makes the manufacture of the workpiece simpler and more cost effective for a user.

Optionally, each first weld joint plane and each second weld joint plane is angled relative to a tangent to a circumference of the revolute body, by the angular offset.

The plane of each of the first weld joint and the second weld joint is inclined relative to a tangent to a circumference of the revolute body. In other words, in the circumferential direction, a radius of one edge of the weld joint plane is different to a radius of a circumferentially opposing edge.

Each of the inclined first weld joint planes and second weld joint planes are inclined in the same sense in a circumferential direction.

Optionally, the angular offset is between 10° and 35°.

The angular offset distance between adjacent first and second weld joint planes must be sufficient to enable the flash displaced from each weld joint to pass either over (radially outwardly of) or under (radially inwardly of) the flash displaced from the adjacent weld joint.

Optionally, the direction of oscillation is parallel to the axis of rotation.

Making the direction of oscillation parallel with the axis of rotation ensures that there remains clearance for the relative movement between the corresponding attachment and stub portions.

Optionally, the revolute body is a rotor, and the first and second attachment portions are aerofoils The finished workpiece may be a bladed compressor disc ('blisk') for a gas turbine engine. In another arrangement, the finished workpiece may be a bladed turbine disc for a gas turbine engine.

Optionally, the flash producing welding process is selected from the group consisting of linear friction welding, orbital welding, and forge welding.

There is a variety of welding processes that result in the extrusion of flash from a weld joint plane. Any such flash producing methods can be used with the workpiece arrangement of the present disclosure to benefit from the offset of the adjacent weld joint planes.

Of these processes, linear friction welding is likely to produce the greatest quantity of flash from the weld joint plane and as such is most likely to benefit from the feature of the offset of the adjacent weld joint planes.

However, in arrangements where adjacent ones of the attachment portion/stub portion joints are closely spaced together, the use of an alternative flash producing welding process such as forge welding would also derive benefit from the arrangement of the disclosure.

According to a third aspect of the present disclosure there is provided a computer program that, when read by a computer, causes performance of the friction welding process according to the second aspect.

According to a fourth aspect of the present disclosure there is provided a non-transitory computer readable storage medium comprising computer readable instructions that, when read by a computer, cause performance of the friction welding process according to the second aspect.

According to a fifth aspect of the present disclosure there is provided a signal comprising computer readable instructions that, when read by a computer, cause performance of the friction welding process according to the second aspect.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE DRAWINGS

Figure 1:
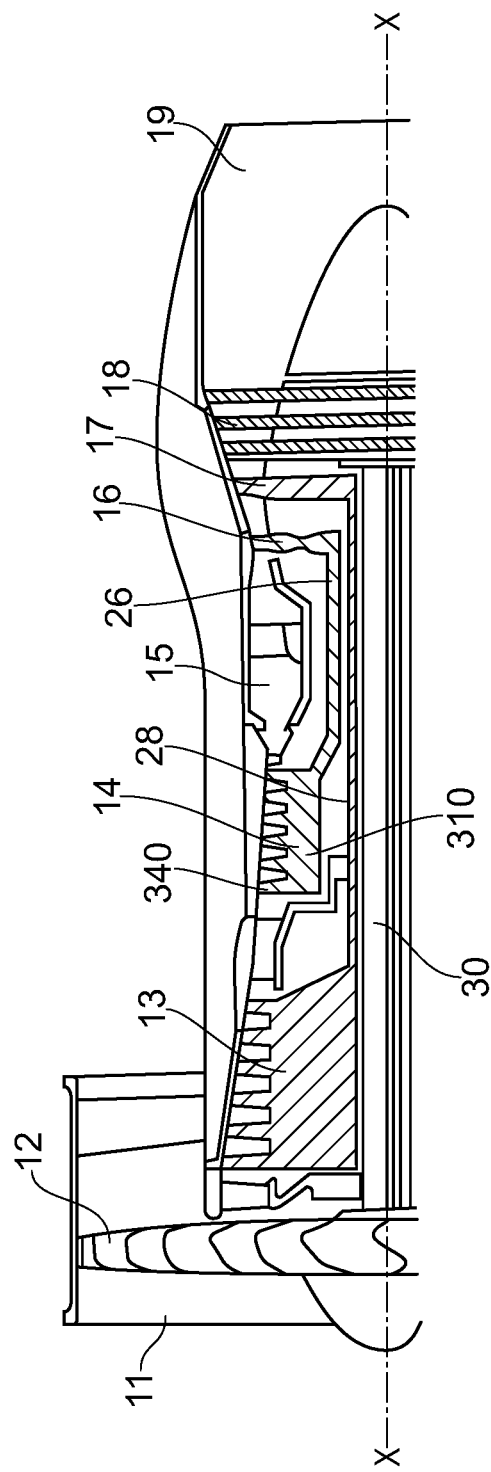
FIG. 1 shows a schematic part sectional view of a gas turbine turbofan engine incorporating a bladed disc made by a process according to the disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Referring to FIGS. 2 to 5, a workpiece according to a first embodiment of the disclosure is designated generally by the reference numeral 100.

The workpiece 100 comprises a revolute body 110, a plurality of first attachment portions 140, and a plurality of second attachment portions 150.

The revolute body 110 comprises an axis of revolution 112. The revolute body 110 also comprises a radius 113. In the present example, the workpiece is a bladed compressor disc (or 'blisk') for a gas turbine engine. One such example application is in the intermediate pressure compressor 14 of the gas turbine engine of FIG. 1, where the revolute body 110 is a rotor 310, and the first and second attachment portions 140,150 are compressor blades (or aerofoils) 340.

The revolute body 110 comprises a plurality of first stub portions 120, and a plurality of second stub portions 130. The first stub portions 120 and the second stub portions 130 are arranged in a circumferential array around the revolute body 110, in an alternating sequence 160.

Each first stub portion 120 comprises a first radially inner weld joint surface 122. The first radially inner weld joint surface 122 is positioned at a first radially inner weld joint surface radius 121 from the axis of rotation 112.

Each second stub portion 130 comprises a second radially inner weld joint surface 132. The second radially inner weld joint surface 132 is positioned at a second radially inner weld joint surface radius 131 from the axis of rotation 112.

The first radially inner weld joint surface radius 121 is different to the second radially inner weld joint surface radius 131. In the present example, the first radially inner weld joint surface radius 121 is smaller than the second radially inner weld joint surface radius 131.

Each of the first attachment portions 140 comprises a first radially outer weld joint surface 142. Each first attachment portion 140 also comprises a first attachment tip 124. The first attachment tip 124 is the radially outermost portion of the first attachment portion 140.

Each of the second attachment portions 150 comprises a second radially outer weld joint surface 152. Each second attachment portion 150 also comprises a second attachment tip 134. The second attachment tip 134 is the radially outermost portion of the second attachment portion 150.

Each of the first radially outer weld joint surfaces 142 is joined to a corresponding one of the first radially inner weld joint surfaces 122 by linear friction welding at a first weld joint plane 162. Each of the second radially outer weld joint surfaces 152 is joined to a corresponding one of the second radially inner weld joint surfaces 132 by linear friction welding at a second weld joint plane 166.

Each of the first weld joint planes 162 is offset from the neighbouring second weld joint plane 166. In the present embodiment, each first weld joint plane 162 is radially offset from the neighbouring second weld joint plane 166 by a radial offset 170. In the present embodiment, the first weld joint plane 162 is positioned radially inwardly of the second weld joint plane 166.

This radial offset 170 between the first and second weld joint planes 162,166 enables the flash 169 generated by the linear friction weld at each of these weld planes 162,166 to be expelled from the respective joint without clashing or otherwise impinging on the flash 169 expelled from the neighbouring linear friction weld joint.

Figure 2:
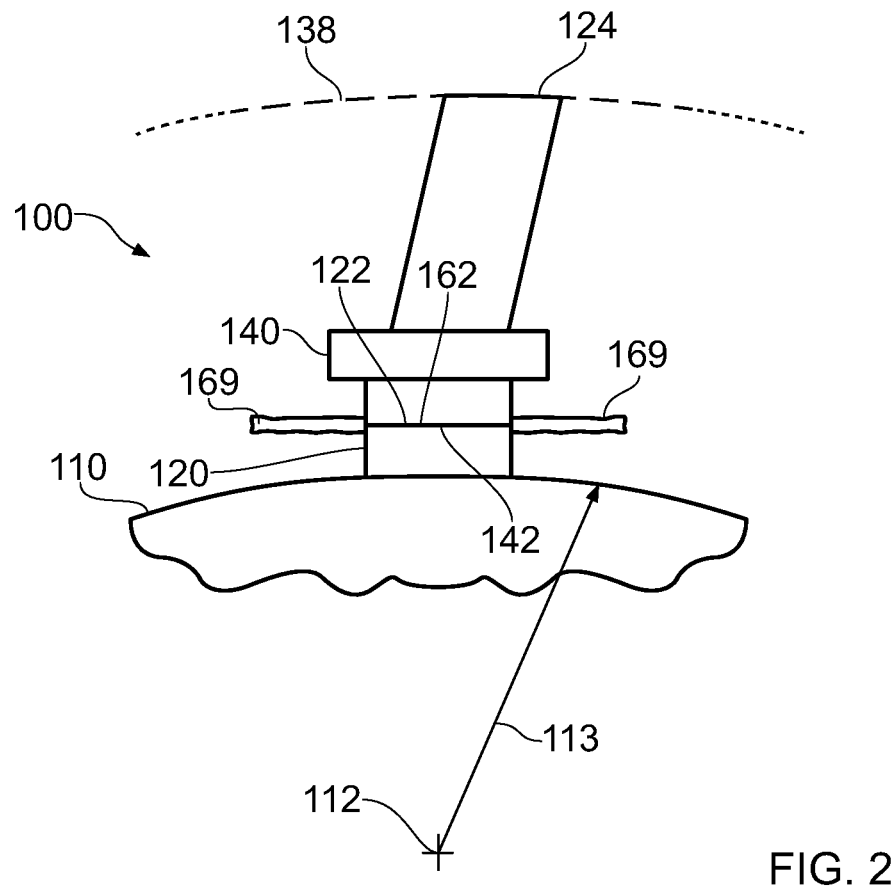
FIG. 2 shows a schematic part sectional view of a workpiece according to a first embodiment of the disclosure showing a single stub and attachment portion to illustrate a problem of the prior art.
Figure 3:
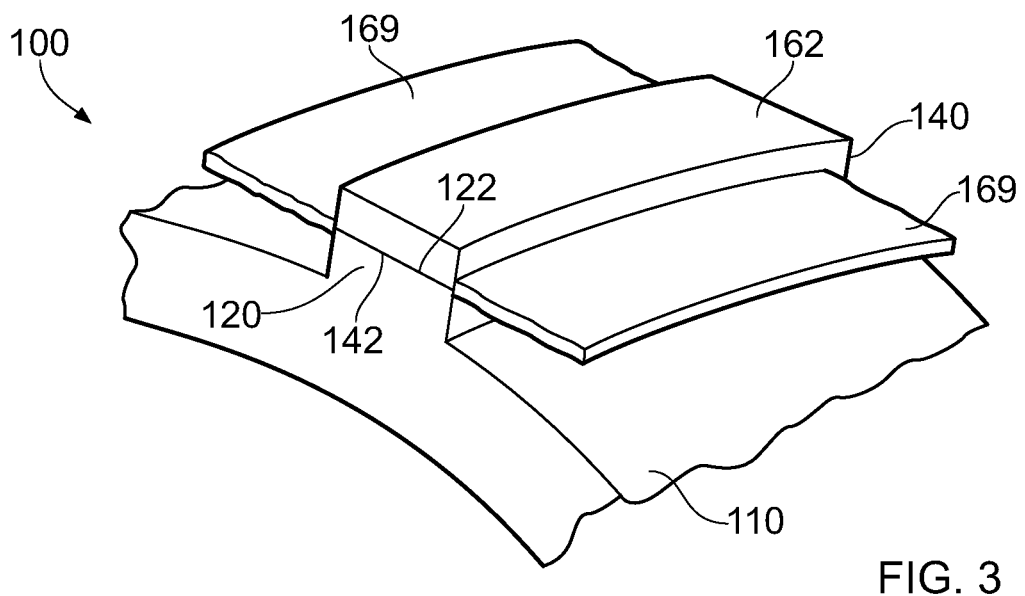
FIG. 3 shows a perspective view of the workpiece of FIG. 2.

FIGS. 2 and 3 illustrate, for the joint between the first stub portion 120 and first attachment portion 140, how the flash 169 is expelled from the linear friction weld plane 162.

Figure 4:
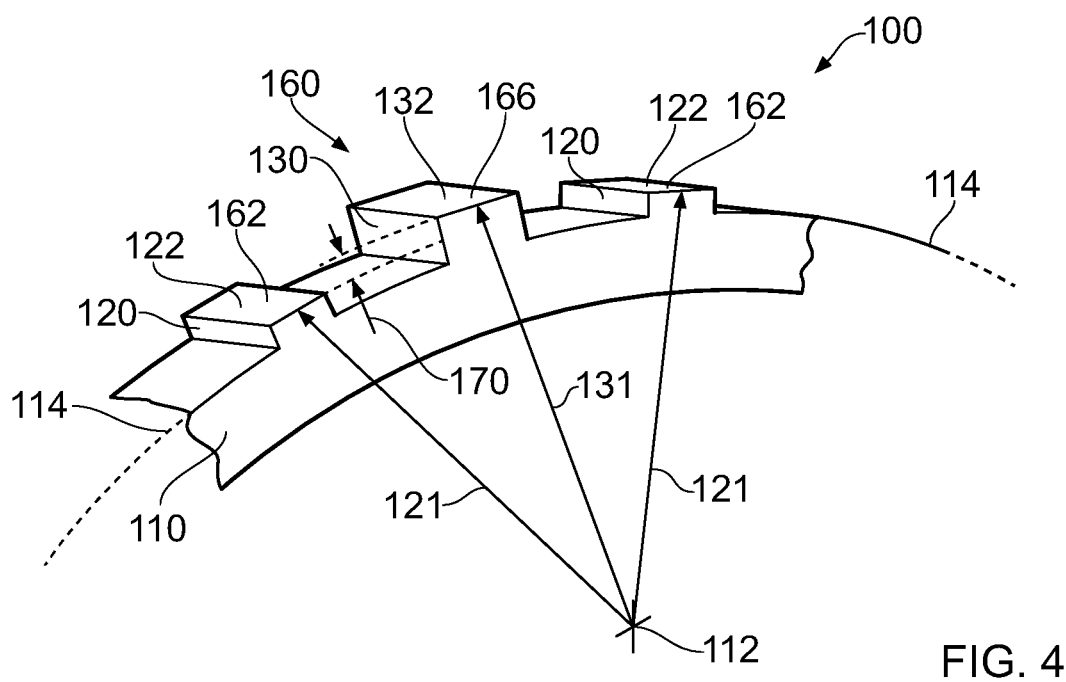
FIG. 4 shows a perspective view of the workpiece of FIG. 2, including multiple adjacent stub and attachment portions.

FIG. 4 illustrates the radially offset arrangement of first stub portions 120 and second stub portions 130 in an alternating circumferential array 160 around a circumference 114 of the revolute body 110.

Figure 5:
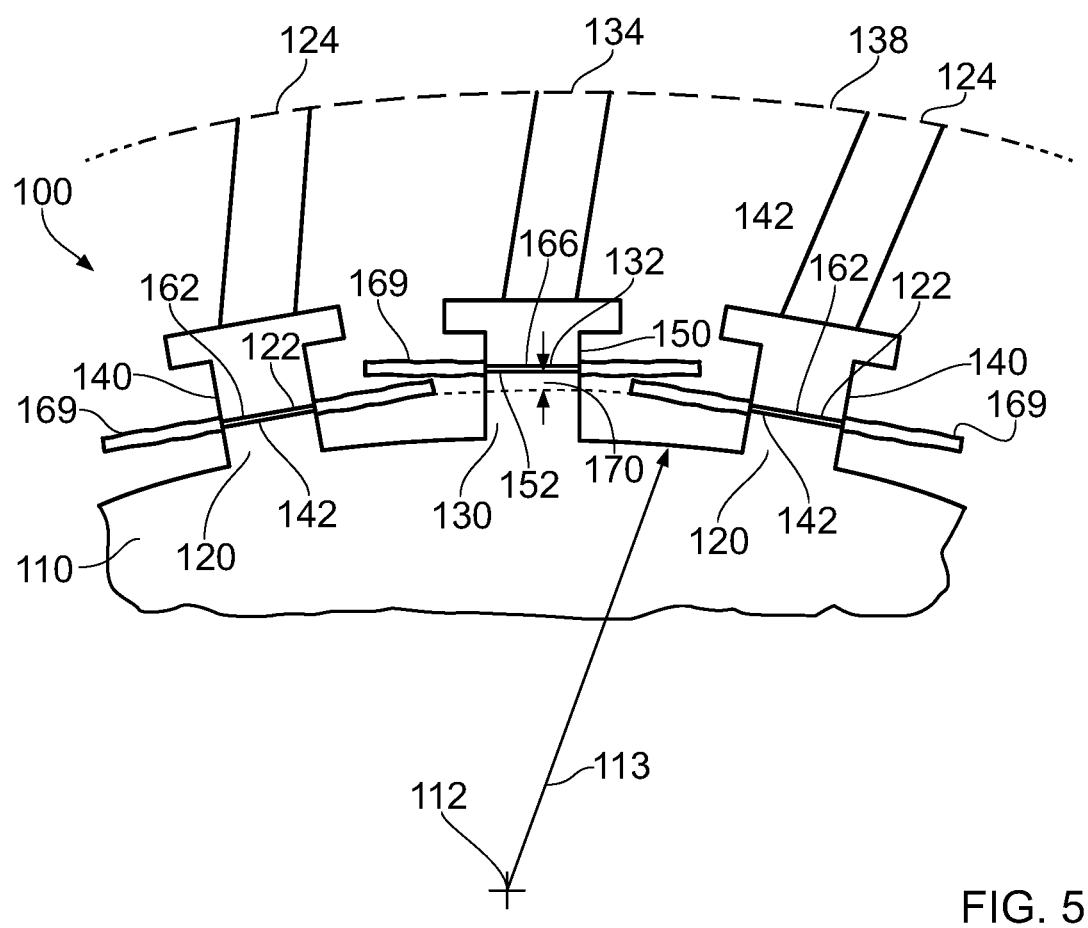
FIG. 5 shows a schematic part sectional view of the workpiece of FIG. 4.

The assembly of the first attachment portions 140 to the first stub portions 120, and the second attachment portions 150 to the second stub portions 130 is shown in FIG. 5. The radial offset 170 between the first weld joint plane 162 and the second weld joint plane 166 enables the flash 169 expelled from the first weld joint plane 162 to pass beneath (i.e. radially inwardly of) the flash 169 expelled from the neighbouring second weld joint plane 166.

Figure 6:
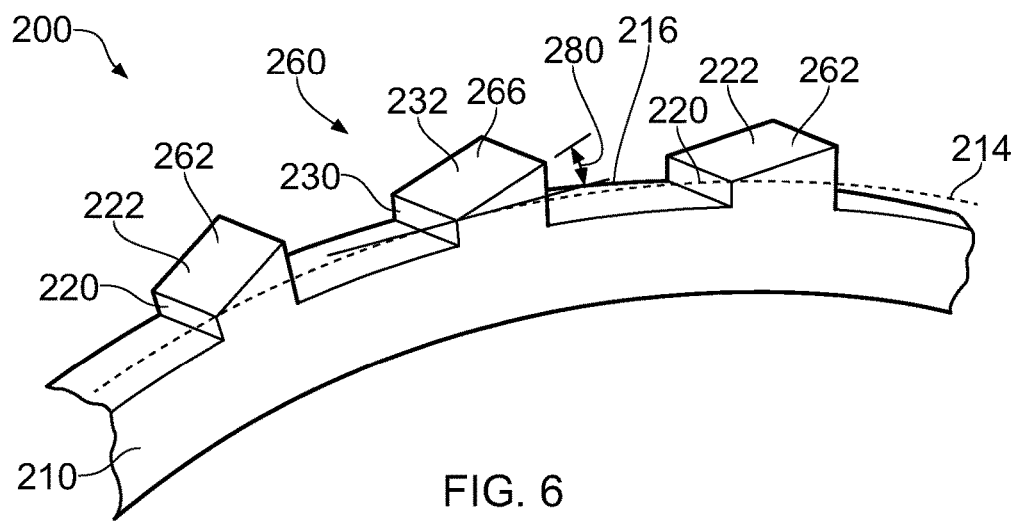
FIG. 6 shows a perspective view of a workpiece according to a second embodiment of the disclosure of FIG. 2, including multiple adjacent stub and attachment portions.
Figure 7:
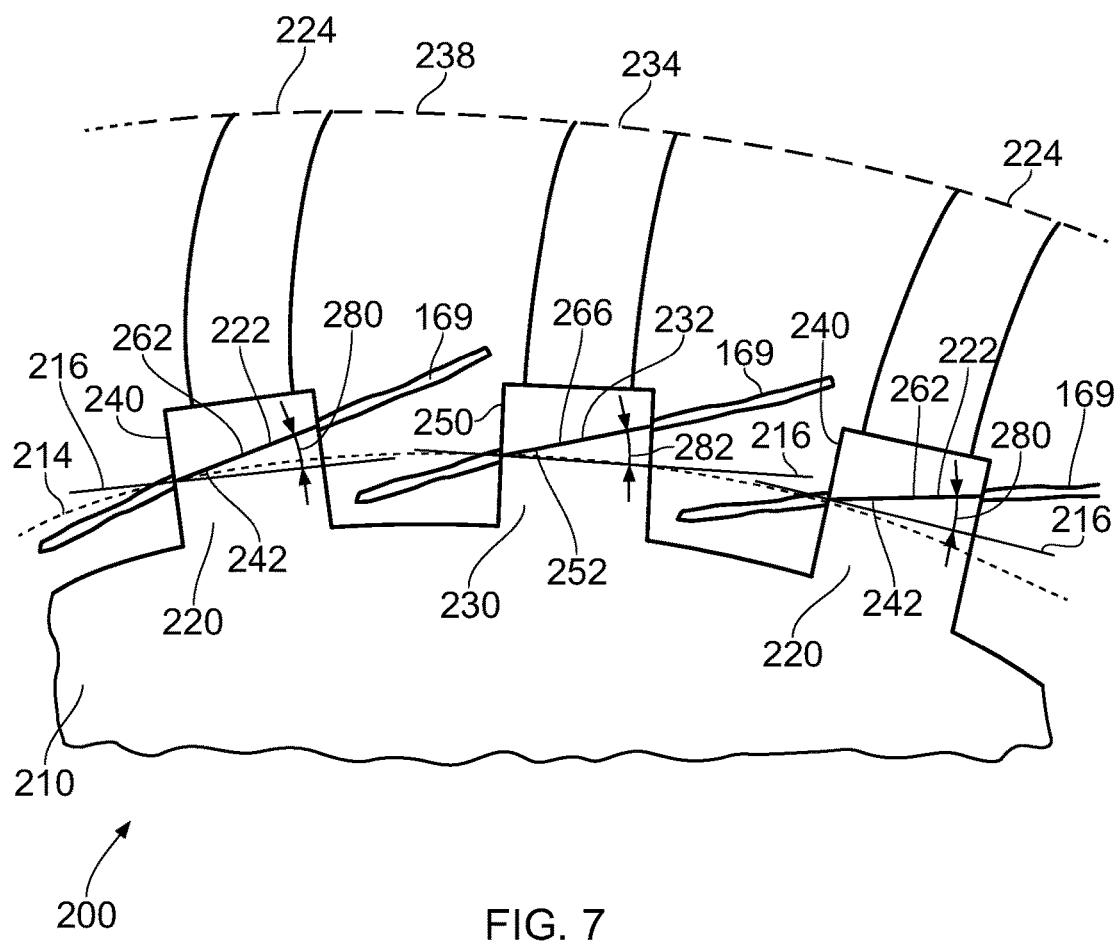
FIG. 7 shows a schematic part sectional view of the workpiece of FIG. 6.

Referring to FIGS. 6 and 7, a workpiece according to a second embodiment of the disclosure is designated generally by the reference numeral 200. Features of the workpiece 200 which correspond to those of workpiece 100 have been given corresponding reference numerals for ease of reference.

The workpiece 200 comprises a revolute body 210, a plurality of first attachment portions 240, and a plurality of second attachment portions 250.

The revolute body 210 comprises an axis of revolution 112. The revolute body 210 also comprises a radius 113. In the present example, the workpiece is a bladed compressor disc (or 'blisk') for a gas turbine engine.

The revolute body 210 comprises a plurality of first stub portions 220, and a plurality of second stub portions 230. The first stub portions 220 and the second stub portions 230 are arranged in a circumferential array around the revolute body 110, in an alternating sequence 260. In this arrangement, the first stub portions 220 are identical to the second stub portions 230. In other arrangements, the first stub portions 220 may be radially offset from the second stub portions 230 in addition to having a respective angular offset.

Each first stub portion 220 comprises a first radially inner weld joint surface 222. The first radially inner weld joint surface 222 is inclined at a first radially inner weld joint surface angle 280 relative to a tangent 216 to a circumference 214 of the revolute body 110.

Each second stub portion 230 comprises a second radially inner weld joint surface 232. The second radially inner weld joint surface 232 is inclined at a second radially inner weld joint surface angle 282 relative to a tangent 216 to a circumference 214 of the revolute body 110.

In the present arrangement, the first radially inner weld joint surface angle 280 is the same as the second radially inner weld joint surface angle 282. In other arrangements, the first radially inner weld joint surface angle 280 may differ from the second radially inner weld joint angle 282.

Each of the first attachment portions 240 comprises a first radially outer weld joint surface 242. Each first attachment portion 240 also comprises a first attachment tip 224. The first attachment tip 224 is the radially outermost portion of the first attachment portion 240.

Each of the second attachment portions 250 comprises a second radially outer weld joint surface 252. Each second attachment portion 250 also comprises a second attachment tip 234. The second attachment tip 234 is the radially outermost portion of the second attachment portion 250.

Each of the first radially outer weld joint surfaces 242 is joined to a corresponding one of the first radially inner weld joint surfaces 222 by linear friction welding at a first weld joint plane 262. Each of the second radially outer weld joint surfaces 252 is joined to a corresponding one of the second radially inner weld joint surfaces 232 by linear friction welding at a second weld joint plane 266.

Each of the first weld joint planes 262 and second weld joint planes 266 is angularly offset from a tangent 216 to a circumference 214 of the revolute body 210.

This angular offset 280,282 of the first and second weld joint planes 262,266 enables the flash 169 generated by the linear friction weld at each of these weld planes 262,266 to be expelled from the respective joint without clashing or otherwise impinging on the flash 169 expelled from the neighbouring linear friction weld joint.

FIG. 6 illustrates the angular offset arrangement of first stub portions 220 and second stub portions 230 in an alternating circumferential array 260 around a circumference 214 of the revolute body 210.

The assembly of the first attachment portions 240 to the first stub portions 220, and the second attachment portions 250 to the second stub portions 230 is shown in FIG. 7.

The angular offset 280 of the first weld joint plane 262 and the angular offset 282 of the second weld joint plane 266 enables the flash 169 expelled from the first weld joint plane 262 to pass beneath the flash 169 expelled from the neighbouring second weld joint plane 266.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A workpiece for use with a flash producing welding process, the workpiece comprising:
   a revolute body comprising an axis of rotation;
   a plurality of first attachment portions, each of the first attachment portions comprising a first radially outer weld joint surface; and
   a plurality of second attachment portions, each of the second attachment portions comprising a second radially outer weld joint surface;
   wherein the revolute body comprises a plurality of first and second stub portions, each of the first stub portions having a first radially inner weld joint surface, each of the second stub portions having a second radially inner weld joint surface, and respective ones of the first stub portions and second stub portions are arranged in an alternating sequence circumferentially around the axis of rotation, each of the first radially outer weld joint surfaces is joined to a corresponding one of the first radially inner weld joint surfaces by a flash producing welding process at a first weld joint plane, each of the second radially outer weld joint surfaces is joined to a corresponding one of the second radially inner weld joint surfaces by a flash producing welding process at a second weld joint plane,
   wherein each first weld joint plane is positioned at a first radius from the axis of rotation, each second weld joint plane is positioned at a second radius from the axis of rotation, the first radius is different to the second radius, and the difference between the first radius and the second radius is a radial offset from the axis of rotation.

2. The workpiece as claimed in claim 1, wherein the radial offset is between 5 and 20 mm.

3. The workpiece as claimed in claim 1, wherein each of the first attachment portions has a first attachment tip, each of the second attachment portions has second attachment tip, and the plurality of first attachment tips and second attachment tips together define a tip circumference.

4. The workpiece as claimed in claim 1, wherein the revolute body is a rotor, and the first and second attachment portions are aerofoils.

5. The workpiece as claimed in claim 1, wherein the flash producing welding process is selected from the group consisting of linear friction welding, orbital welding, and forge welding.

6. A method for forming a workpiece, the method comprising the steps of: providing a revolute body having an axis of rotation, and a plurality of first and second stub portions arranged in an alternating circumferential array around the axis of rotation, each first stub portion having a first radially inner weld joint surface, and each second stub portion having a second radially inner weld joint surface; providing a first attachment portion corresponding to each first stub portion, and a second attachment portion corresponding to each second stub portion, each first attachment portion comprising a first radially outer weld joint surface, and each second attachment portion comprising a second radially outer weld joint surface; and using a flash producing welding process to weld each first radially outer weld joint surface to a corresponding first radially inner weld joint surface at a first weld joint plane, and each second radially outer weld joint surface to a corresponding second radially inner weld joint surface at a second weld joint plane to form the workpiece,
   wherein each first weld joint plane is positioned at a first radius from the axis of rotation, each second weld joint plane is positioned at a second radius from the axis of rotation, the first radius being different to the second radius, and the difference between the first radius and the second radius is a radial offset from the axis of rotation.

7. The method as claimed in claim 6, wherein the radial offset is between 5 and 20 mm.

8. The method as claimed in claim 6, wherein the revolute body is a rotor, and the first and second attachment portions are aerofoils.

9. The method as claimed in claim 6, wherein the flash producing welding process is selected from the group consisting of linear friction welding, orbital welding, and forge welding.

10. A computer program that, when read by a computer, causes performance of the method as claimed in claim 6.

11. A non-transitory computer readable storage medium comprising computer readable instructions that, when read by a computer, cause performance of the friction welding process as claimed in claim 6.

\* \* \* \* \*